(12) United States Patent
Olivier

(10) Patent No.: US 9,550,340 B2
(45) Date of Patent: Jan. 24, 2017

(54) COMPOSITE MATERIAL PART COMPRISING FIXING MEANS

(75) Inventor: Loic Olivier, Alfortville (FR)

(73) Assignee: SNECMA, Paris (FR)

(*) Notice: Subject to any disclaimer, the term of this patent is extended or adjusted under 35 U.S.C. 154(b) by 600 days.

(21) Appl. No.: 13/984,934

(22) PCT Filed: Mar. 1, 2012

(86) PCT No.: PCT/FR2012/050436
§ 371 (c)(1),
(2), (4) Date: Oct. 4, 2013

(87) PCT Pub. No.: WO2012/117209
PCT Pub. Date: Sep. 7, 2012

(65) Prior Publication Data
US 2014/0017074 A1 Jan. 16, 2014

(30) Foreign Application Priority Data
Mar. 3, 2011 (FR) ...................................... 11 51740

(51) Int. Cl.
F01D 25/28 (2006.01)
B32B 3/08 (2006.01)
(Continued)

(52) U.S. Cl.
CPC ................ B32B 3/08 (2013.01); B29B 11/16 (2013.01); B29C 70/24 (2013.01); B29C 70/68 (2013.01); B29C 70/86 (2013.01); C04B 35/571 (2013.01); C04B 35/806 (2013.01); C04B 35/83 (2013.01); F01D 25/24 (2013.01); F01D 25/28 (2013.01); F04D 29/403 (2013.01); B29L 2031/08 (2013.01); C04B 2235/48 (2013.01);
(Continued)

(58) Field of Classification Search
CPC ............ F01D 25/24; F01D 25/28; F02C 7/32; B29B 11/16; B29C 70/222; Y02T 50/672
USPC ......................................................... 415/200
See application file for complete search history.

(56) References Cited

U.S. PATENT DOCUMENTS 4,313,244 A * 2/1982 Authier .................. A44B 19/14
24/408
4,407,885 A * 10/1983 Murphy ................ D06M 23/06
428/402
(Continued)

FOREIGN PATENT DOCUMENTS

DE 198 34 772 2/2000
FR 2 553 712 4/1985
(Continued)

OTHER PUBLICATIONS

International Search Report Issued May 7, 2012 in PCT/FR12/050436 Filed Mar. 1, 2012.

Primary Examiner — Ninh H Nguyen
Assistant Examiner — Aaron R Eastman
(74) Attorney, Agent, or Firm — Oblon, McClelland, Maier & Neustadt, L.L.P.

(57) ABSTRACT

A fiber structure for reinforcing a composite material part is obtained by multilayer weaving between a plurality of layers of warp yarns and a plurality of layers of weft yarns. The fiber structure includes fastener elements on at least one of its faces, each fastener element including a body placed under yarns present on a face of the fiber structure, and fastener portions situated over the yarns.

19 Claims, 10 Drawing Sheets

(51) Int. Cl.
  *B29B 11/16*   (2006.01)
  *B29C 70/24*   (2006.01)
  *B29C 70/86*   (2006.01)
  *F01D 25/24*   (2006.01)
  *B29C 70/68*   (2006.01)
  *F04D 29/40*   (2006.01)
  *C04B 35/571*  (2006.01)
  *C04B 35/80*   (2006.01)
  *C04B 35/83*   (2006.01)
  *B29L 31/08*   (2006.01)

(52) U.S. Cl.
  CPC .  *C04B 2235/483* (2013.01); *F05B 2280/6003* (2013.01); *F05D 2300/603* (2013.01); *Y02T 50/672* (2013.01); *Y10T 428/24008* (2015.01)

(56)  References Cited

U.S. PATENT DOCUMENTS

| | | | |
|---|---|---|---|
| 5,024,874 A | 6/1991 | Yasui et al. | |
| 6,516,499 B2* | 2/2003 | Yamaguchi | A44B 19/40 24/389 |
| 2005/0146076 A1 | 7/2005 | Alexander et al. | |
| 2006/0057920 A1 | 3/2006 | Wigent, III | |
| 2008/0206048 A1* | 8/2008 | Coupe | B29C 70/24 415/200 |
| 2009/0280707 A1 | 11/2009 | Bouillon et al. | |
| 2012/0144836 A1* | 6/2012 | Ress, Jr. | F01D 25/30 60/767 |

FOREIGN PATENT DOCUMENTS

| | | |
|---|---|---|
| FR | 2 902 802 | 12/2007 |
| WO | 2005 050409 | 6/2005 |

* cited by examiner

COMPOSITE MATERIAL PART COMPRISING FIXING MEANS

BACKGROUND OF THE INVENTION

The present invention relates to making composite material parts, and more particularly parts fitted with attachment or fastener means, in particular for supporting pieces of equipment.

A field of application of the invention is more particularly making parts out of structural composite material, i.e. structural parts having fiber reinforcement densified by a matrix. Composite materials make it possible to make parts of overall weight that is less than the weight those same parts would have if they were made of a metal material. The fiber reinforcement of composite material parts of standard shapes, such as shrouds or panels, is generally made as a single piece by multilayer weaving between layers of warp yarns and layers of weft yarns. Once the reinforcement has been densified by a matrix, it provides a good distribution of local mechanical forces over the entire part, thereby giving the part good structural characteristics and high mechanical strength.

With parts made of metal material, pieces of equipment or supports for use in fastening such pieces of equipment are fastened directly to the part, in particular by welding, or by means of holes drilled in the part and suitable for passing fastener members such as bolts or rivets.

Nevertheless, with a composite material part, it is not possible to weld supports or pieces of equipment directly onto the part. Furthermore, drilling holes weakens the part mechanically, since holes create gaps in the paths along which forces are transmitted. For parts that are for use in aviation, such as turboprop casings, holes are not allowed in the zone for retaining the part.

OBJECT AND SUMMARY OF THE INVENTION

It is therefore desirable to be able to have composite material parts that enable pieces of equipment to be fastened thereto, in particular by welding or brazing, and without that requiring holes to be made in the structural body of the part.

To this end, the invention provides a fiber structure for reinforcing a composite material part, said structure being obtained by multilayer weaving between a plurality of layers of warp yarns and a plurality of layers of weft yarns, the fiber structure being characterized in that it further includes, at least on one of its faces, one or more fastener elements, each fastener element comprising a body arranged at least in part under yarns present on a face of said fiber structure, and at least one fastener portion situated over said yarns.

Thus, by using a fiber structure of the invention it is possible to form composite material parts that include fastener elements secured to the part and having fastener portions that can be used for fastening pieces of equipment without weakening the structural nature of the part.

In a first aspect of the invention, each fastener element is made of metal material, thereby enabling pieces of equipment or other fastener element portions to be fastened onto the part, in particular by welding, brazing, or metal adhesive.

In a second aspect of the invention, each fastener element comprises first and second fastener portions extending on either side of said body and over yarns of the fiber structure.

In a third aspect of the invention, said first and second portions present a flat shape.

In a fourth aspect of the invention, each fastener portion corresponds to a fastener tab.

In a fifth aspect of the invention, each fastener portion is extended by a retaining tab arranged under one or more yarns of the fiber structure.

The invention also provides a composite material part including a fiber structure of the invention.

In an embodiment of the invention, each fastener element further includes a strap fastened to each fastener portion.

In an aspect of the invention, the part constitutes an aeroengine casing.

The invention also provides a turboprop including an aeroengine casing of the invention.

The invention also provides a aircraft fitted with at least one turboprop of the invention.

The present invention also provides a method of making a composite material part, the method comprising the following steps:

making a fiber structure by multilayer weaving between a plurality of layers of warp yarns and a plurality of layers of weft yarns;

shaping the fiber structure; and densifying the preform with a matrix;

the method being characterized in that it further comprises, before densifying the preform, inserting a body of at least one fastener element under yarns present on a face of the fiber structure, each fastener element also including at least one fastener portion situated over said yarns.

In a first aspect of the method of the invention, during insertion of the body of each fastener element under the yarns that are accessible from a face of the fiber structure, said yarns are loosened in such a manner as to enable each fastener element to pass thereunder, said yarns subsequently being tightened.

In a second aspect of the invention, each fastener element is arranged on the fiber structure during weaving, with one or more additional layers being woven over its fastener element.

In a third aspect of the method of the invention, during insertion of each fastener element under yarns of the fiber structure, the fastener element is in the form of a rod. After said insertion, at least a portion of the fastener element situated over yarns of the fiber structure is flattened so as to form a fastener portion.

In a fourth aspect of the method of the invention, while the preform is being densified, the face of each fastener portion of a fastener element that faces away from the fiber structure is treated so as to be cleared of any matrix at the end of densification.

In a fifth aspect of the method of the invention, each fastener portion is extended by a retaining tab that is arranged under one or more yarns of the fiber structure during insertion of the fastener element(s) under the yarns of the structure.

In a sixth aspect of the method of the invention, each fastener element also includes a strap fastened on each of the fastener portions.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general to making composite material parts comprising fiber reinforcement densified by a matrix and in which the body is for holding or supporting pieces of equipment (boxes, cables, etc.). The term "body" is used herein to mean any structural portion of a part that is particularly, but not exclusively, in the form of a body of revolution, such as a shroud.

In accordance with the invention, one or more fastener elements are incorporated in at least one surface of the body, in particular to enable pieces of equipment to be held or fastened without requiring drilling into the body of the part.

Figure 1:
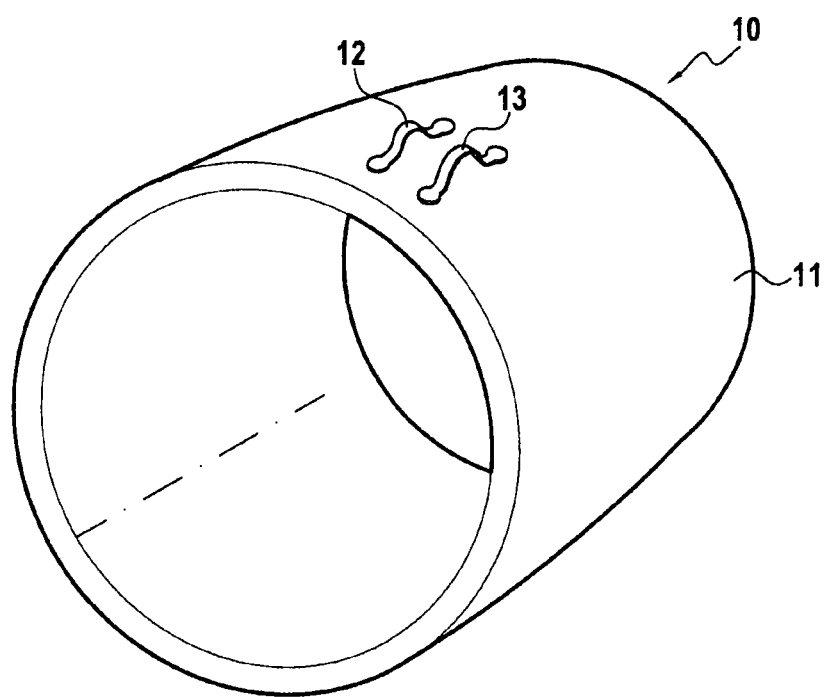
FIG. 1 is a perspective view of an aeroengine casing in accordance with an embodiment of the invention.

FIG. 1 shows an airplane engine casing 10 of composite material made up of a shroud 11 having first and second fastener elements 12 and 13 for attaching pieces of equipment to the shroud 11 or for passing and holding cables (not shown in FIG. 1).

Figure 2:
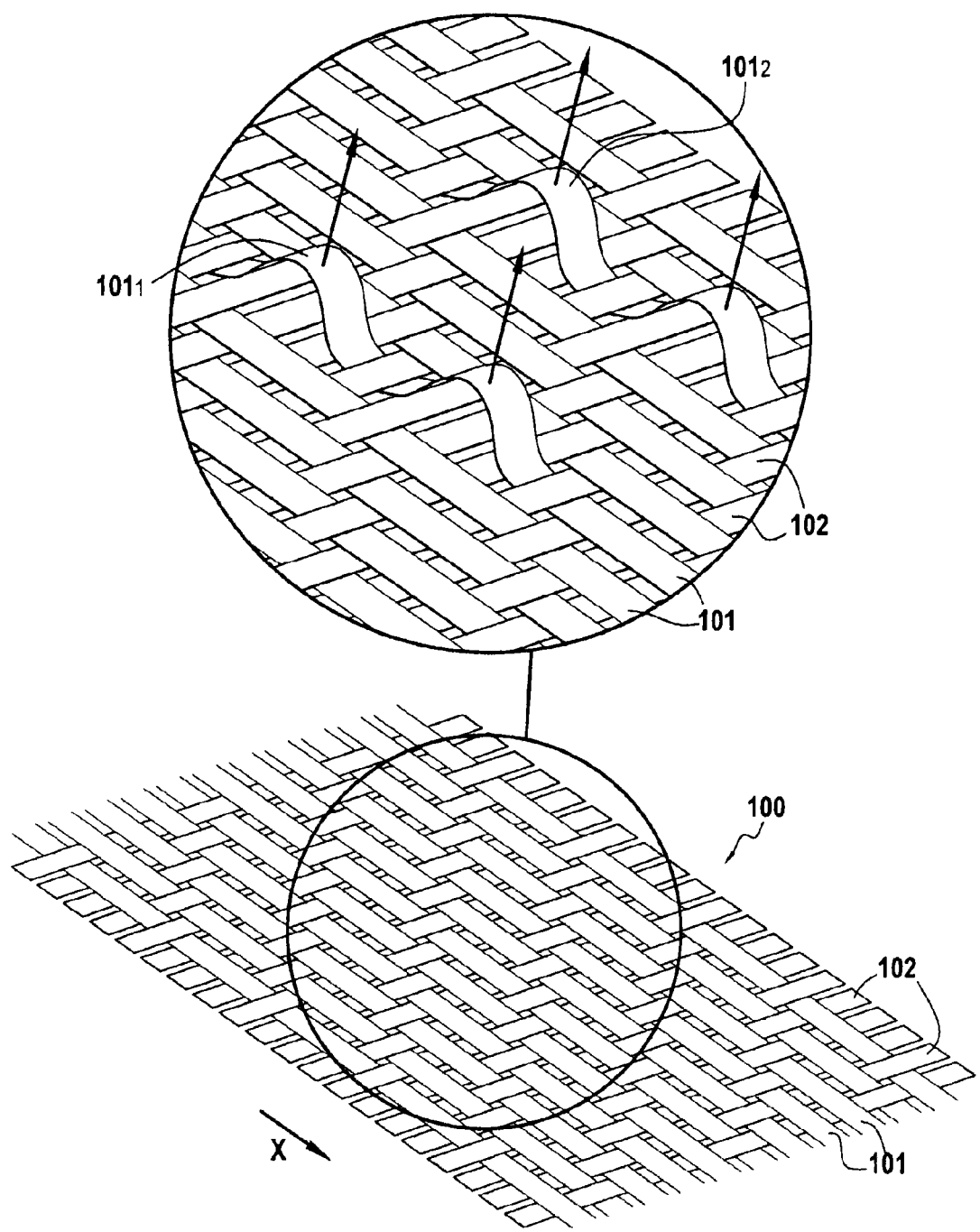
FIG. 2 is a diagrammatic perspective view of a portion of a fiber structure for fabricating the FIG. 1 aeroengine casing.
Figure 3A:
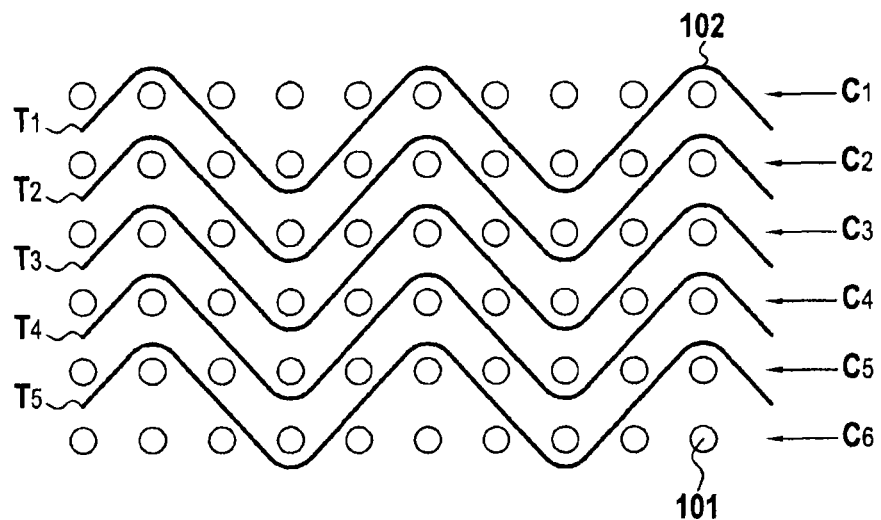
FIGS. 3A to 3D are weft section views on an enlarged scale showing an example of the arrangement of the weft yarns in the FIG. 2 fiber structure.
Figure 3B:
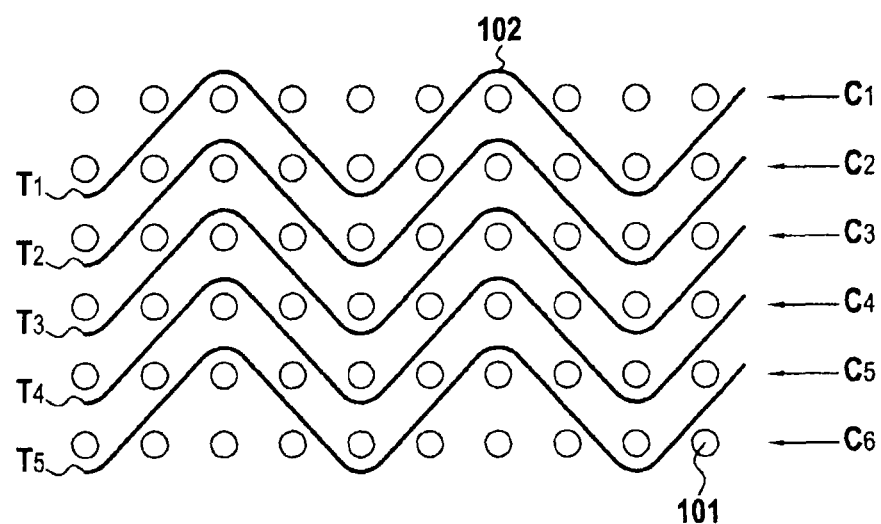
Figure 3C:
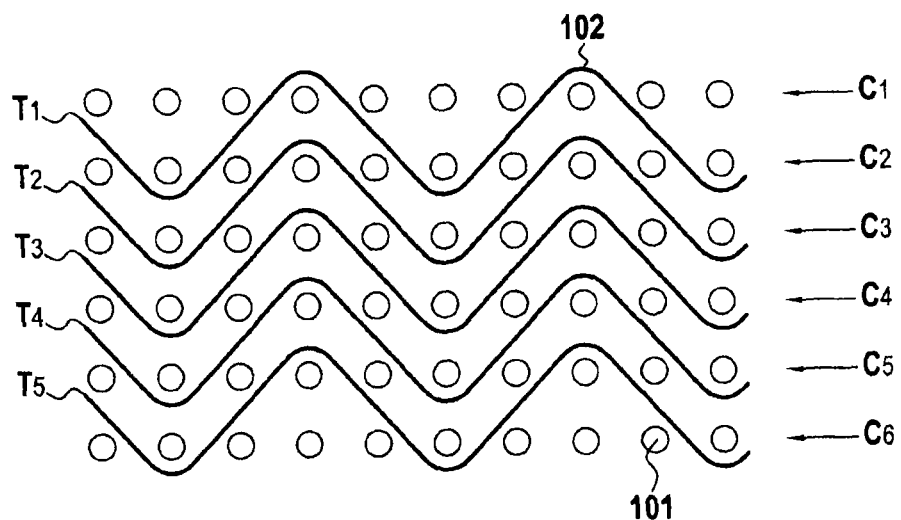
Figure 3D:
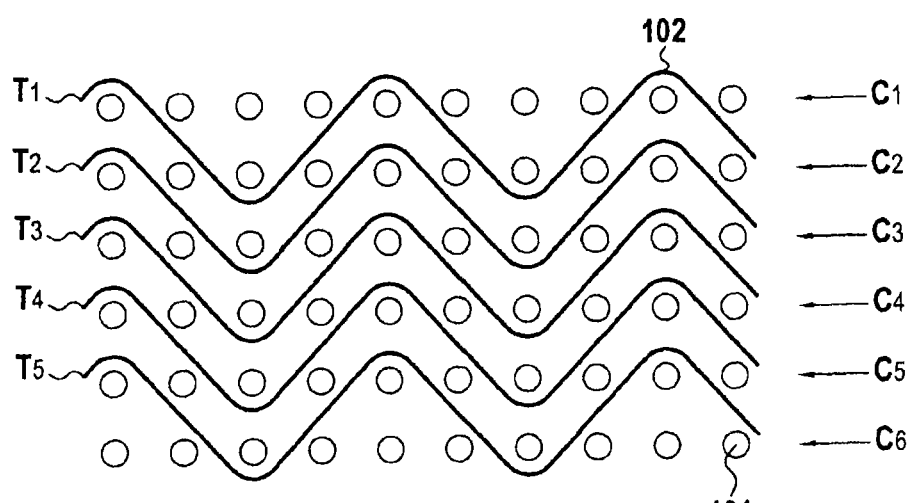

FIG. 2 is a highly diagrammatic view of a fiber blank 100 for use in forming the fiber reinforcement of the shroud 11 of the casing 10.

As shown diagrammatically in FIG. 2, the fiber blank 100 is obtained by multilayer weaving performed in conventional manner by means of a Jacquard type loom on which there is arranged a bundle of warp yarns 101 or strands in a plurality of layers, the warp yarns being interlinked by weft yarns 102.

In the example shown, the multilayer weaving is weaving with an "interlock" type weave. The term "interlock" is used herein to mean a weave in which each layer of weft yarns interlinks a plurality of layers of warp yarns with all of the yarns in a given weft column having the same movement in the weave plane.

The term "yarn" is used herein to mean strands each made up of a set of non-woven filaments. In particular, each yarn may comprise a twisted strand of 3000 to 12,000 filaments.

Other known types of multilayer weaving could naturally be used.

The fiber blank of the invention may be woven particularly, but not exclusively, from yarns made of carbon fiber or of ceramic fiber, such as silicon carbide fiber.

As shown in FIG. 2, the fiber blank 100 is in the form of a strip extending lengthwise in a direction X, the blank 100 being intended to form the shroud 11 of the casing 10 after it has been shaped and densified.

One way of performing multilayer weaving of the blank 100 with an interlock type weave is shown diagrammatically in FIGS. 3A to 3D, which are respective fragmentary views on a larger scale of successive warp section planes. In this example, the blank 100 has six layers of warp yarns 101 extending in the direction X. In FIGS. 3A to 3D, the six layers of warp yarns $C_1$ to $C_6$ are interlinked by weft yarns $T_1$ to $T_5$. For simplification purposes, only six layers of warp yarns and only five layers of weft yarns are shown herein, naturally extending along the (width and thickness) dimensions of the fiber structure that it is desired to obtain, which structure could be made with numbers of layers of warp yarns and of weft yarns and with numbers of yarns per layer that are much greater.

At the end of weaving, the non-woven warp and weft yarns are cut off in order to extract the blank 100 as shown in FIG. 2, where the blank is shown as at the end of multilayer weaving.

Figure 4:
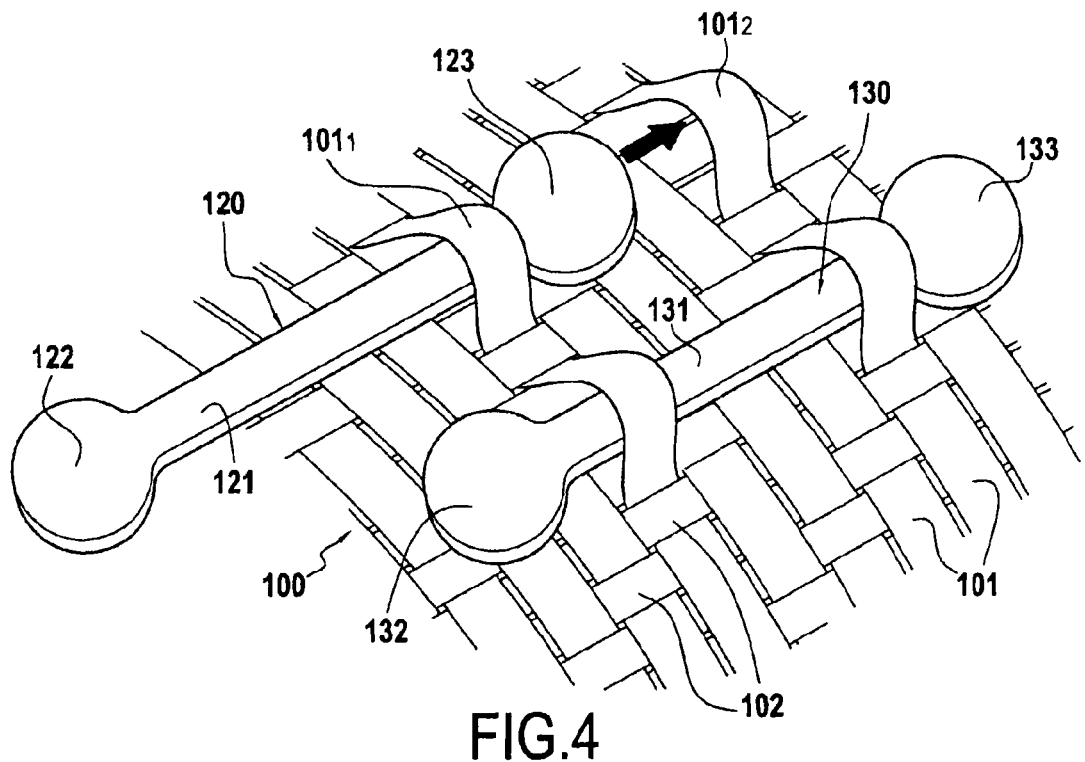
FIG. 4 is a diagrammatic perspective view showing the insertion of two fastener bases in the FIG. 2 fiber structure.

Once the fiber blank 100 has been shaped, fastener bases 120 and 130 are inserted under the yarns of the fiber structure 120, as shown in FIG. 4. In the presently-described example, the element 120 or 130 is made up of a respective body 121 or 131 having, at its two ends, respective fastener portions 122 & 123 or 132 & 133, which portions are flat in shape. The fastener bases 120 and 130 are preferably, but not exclusively, made of a metal material so as to enable other portions of fastener elements or of equipment to be fastened to the fastener portions 122, 123, 132, and 133 by welding or brazing.

Still in the presently-described embodiment, warp yarns $101_1$ and $101_2$ are pulled away locally (FIG. 2) in order to loosen them and allow the bodies 121 and 131 respectively of the bases 120 and 130 to pass under those yarns.

Figure 5:
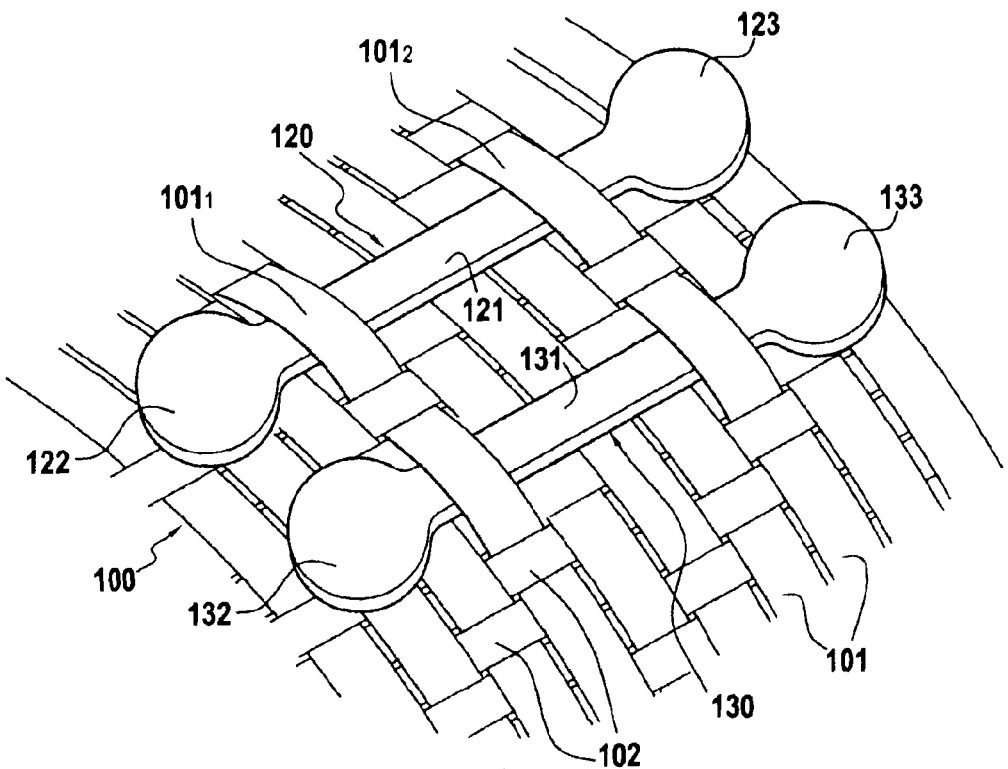
FIG. 5 is a diagrammatic perspective view showing the FIG. 2 fiber structure after the fastener bases have been inserted therein.

Once the bases 120 and 130 have been positioned in this way, the warp yarns $101_1$ and $101_2$ are tightened so as to be pressed against the bodies 121 and 131, as shown in FIG. 5.

Figure 6:
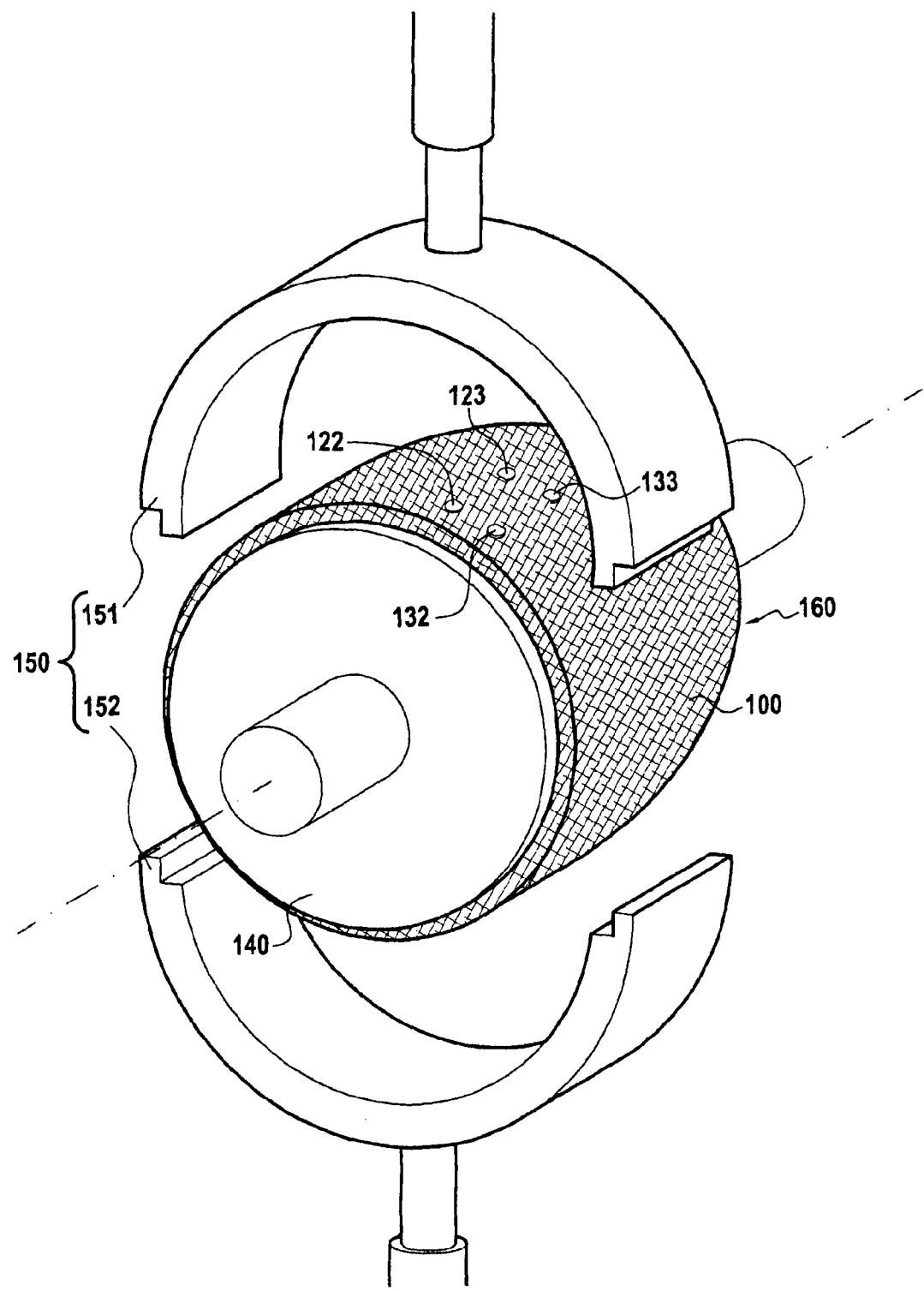
FIG. 6 is a diagrammatic perspective view showing the shaping of the FIG. 5 fiber structure before densification.

Thereafter, the fiber blank 100 is shaped in order to form the shroud 11 of the casing 10 as shown in FIG. 6. For this purpose, and as shown in FIG. 6, the fiber blank 100 is shaped on a mold 140, here in the form of a mandrel, and corresponding to the inside shape of the casing 10 that is to be made. By way of example, the free ends of the blank 100 may be sewn together prior to densification, or they may merely be superposed, with the ends then being bonded together during densification. This produces a fiber preform 160 that is ready for densifying. In variant embodiments, the fiber blank presents a length that corresponds to several times the circumference of the casing.

The fiber preform 160 is then densified, where densification consists in filling in the pores of the preform, through all or part of its volume, with a material for constituting the matrix.

The matrix of the composite material constituting the structure of streamlined profile may be obtained in known manner using the liquid technique.

The liquid technique consists in impregnating the preform with a liquid composition that contains an organic precursor for the material of the matrix. The organic precursor is usually in the form of a polymer, such as a resin, possibly diluted in a solvent. The preform is placed in a mold that may be closed in sealed manner so as to have a cavity with the shape of the final molded part. In this example, the preform is placed between the mold 140 and a countermold 150 made up of two portions 151 and 152, the mold and the countermold respectively having the inside shape and the outside shape of the casing that is to be made. Once the countermold 150 has been closed, the liquid precursor of the matrix (e.g. a resin) is injected throughout the cavity in order to impregnate all of the fiber portion of the preform.

The precursor is transformed into an organic matrix, i.e. it is polymerized, by applying heat treatment, generally by heating the mold, and after eliminating any solvent and after curing the polymer, with the preform continuing to be held in the mold that has a shape corresponding to the shape of the part that is to be made. The organic matrix may in particular be obtained using epoxy resins, such as high performance epoxy resin, for example, or by using liquid precursors for matrices that may be carbon or ceramic.

When forming a carbon or ceramic matrix, the heat treatment consists in polymerizing the organic precursor in order to transform the organic matrix into a matrix of carbon or of ceramic, depending on the precursor used and on the pyrolysis conditions. By way of example, liquid precursors for carbon may be resins having a relatively high coke content, such as phenolic resins, whereas liquid precursors for ceramic, in particular for SiC, may be resins of the polycarbosilane (PCS) type or of the polytitanocarbosilane (PTCS) type or of the polysilazane (PSZ) type. Several successive cycles going from impregnation to heat treatment may be performed in order to achieve the desired degree of densification.

In an aspect of the invention, the fiber preform may be densified by the well-known resin transfer molding (RTM) method. In the RTM method, the fiber preform 160 is placed between a mold and a countermold respectively presenting the inside shape and the outside shape of the casing that is to be made (like the mold 140 and the countermold 150). A thermosetting resin is then injected into the inside space defined between the mold and the countermold and that contains the fiber preform. A pressure gradient is generally established in this inside space between the location where the resin is injected and orifices for discharging the resin in order to control and optimize impregnation of the preform with the resin.

By way of example, the resin used may be an epoxy resin. Resins suitable for RTM methods are well known. They preferably present low viscosity in order to facilitate injection into the fibers. The temperature class and/or the chemical nature of the resin are determined as a function of the thermomechanical stresses to which the part is to be subjected. Once the resin has been injected into the reinforcement, it is polymerized by heat temperature in application of the RTM method.

Whatever the densification method used, care should be taken to avoid depositing resin or forming matrix on the faces of the fastener portions 122, 123, 132, and 133 that face away from the fiber blank, e.g. by scraping away any resin flash that might be present thereon, or by any other treatment that enables them to be cleaned.

Figure 7:
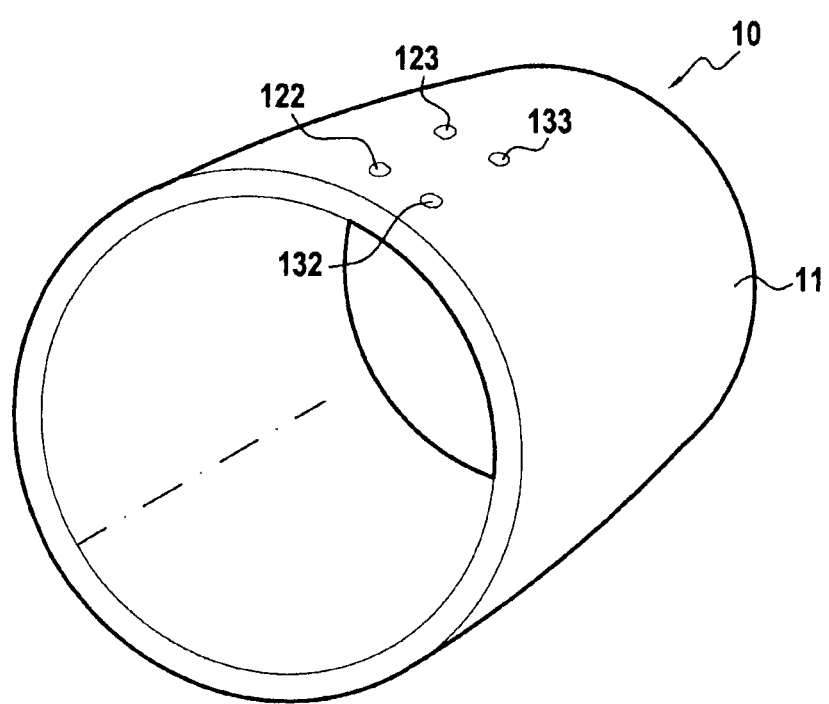
FIG. 7 is a diagrammatic perspective view showing the part obtained after densifying the FIG. 6 fiber preform.
Figure 8:
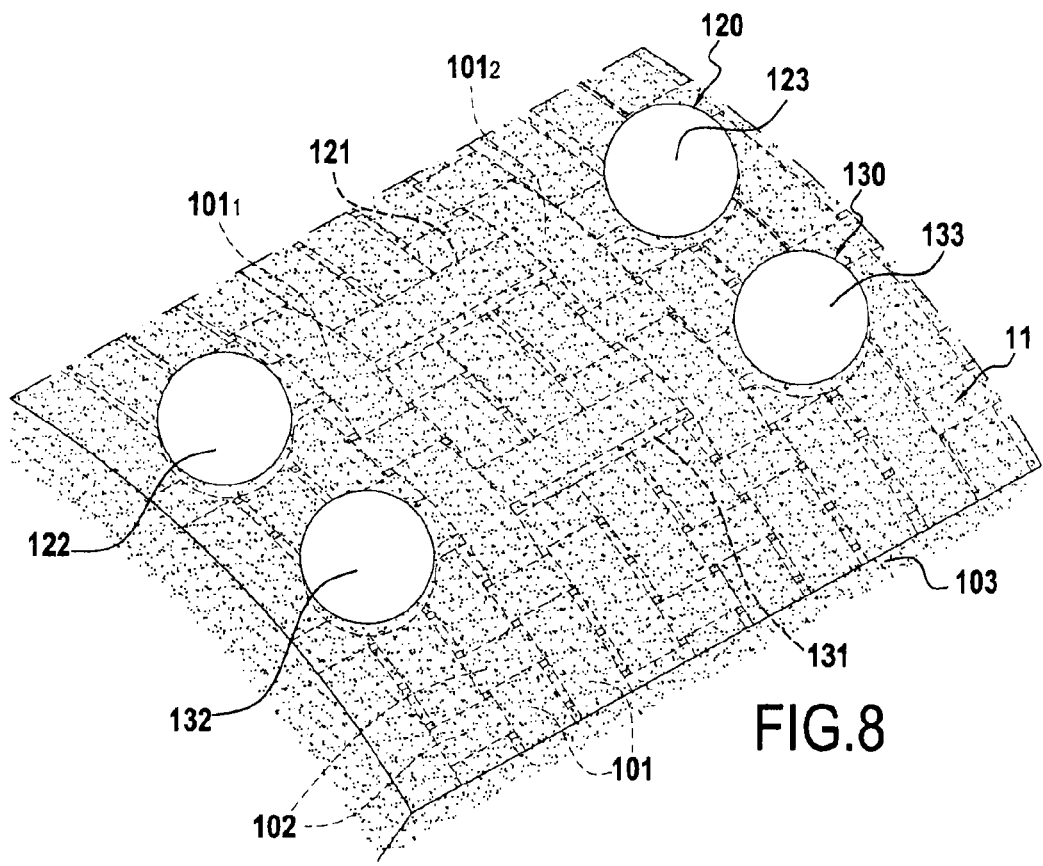
FIG. 8 is a diagrammatic perspective view showing the portion of the FIG. 1 aeroengine casing that has the fastener bases.

After injection and polymerization, the part is unmolded. The part is then trimmed to remove excess resin and chamfers are machined in order to obtain a single-piece casing 10 as shown in FIG. 7 made up of the shroud 11 that includes the fastener portions 122, 123, 132, and 133 of the fastener bases 120 and 130 in its outside surface. As shown in FIG. 8, the bodies 121 and 131 of the bases 120 and 130 are held on the shroud 11 of the casing both by the warp yarns $101_1$ and $101_2$ and by the polymerized resin 103 (matrix). Under such circumstances, the fastener elements of the composite material part of the invention are constituted by the fastener bases 120 and 130.

Figure 9:
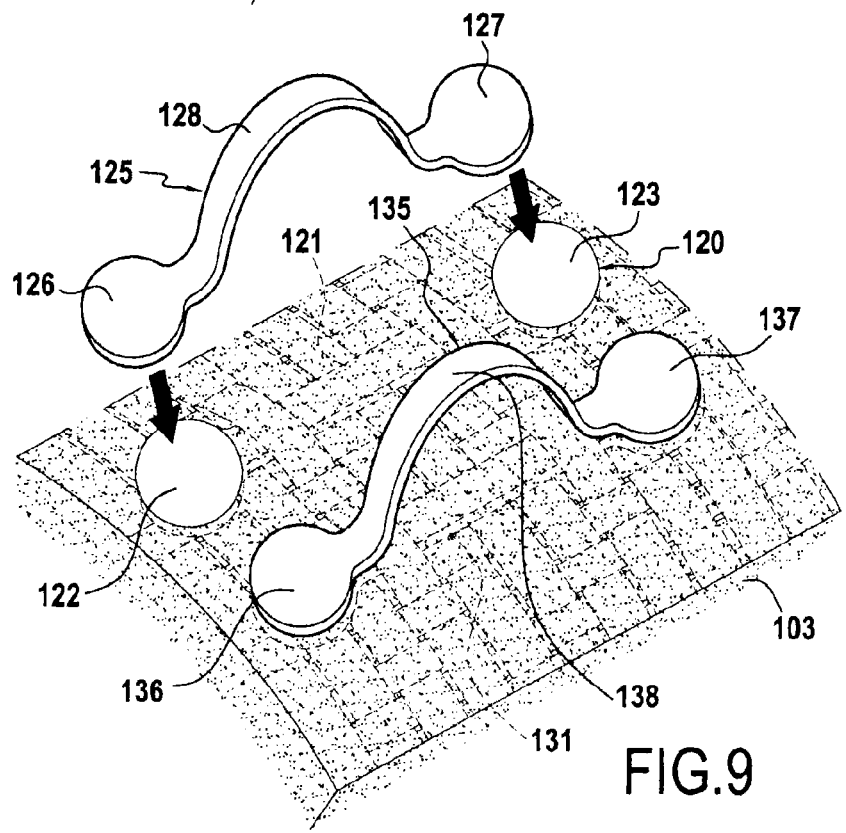
FIG. 9 is a diagrammatic perspective view showing the portion of the FIG. 1 aeroengine casing that has the fastener bases with straps fastened thereto.

As shown in FIG. 9, the portions 122, 123, 132, and 133 may be used for fastening straps 125 and 135. More precisely, the strap 125 comprises an arcuate body 128 with flat end portions 126 and 127 that are fastened respectively to the fastener portions 122 and 123 of the base 120, e.g. by welding, brazing, or metal adhesive. Likewise, the strap 135 comprises an arcuate body 138 with flat end portions 136 and 137 that are fastened respectively to the fastener portions 132 and 133 of the base 130, e.g. by welding, brazing, or metal adhesive. Under such circumstances, the fastener elements 12 and 13 of the casing 10 are constituted respectively by the fastener bases 120 and 130 and by the straps 125 and 135.

In a variant embodiment, one or more pieces of equipment are fastened directly to the fastener portions 122, 123, 132, and 133 of the fastener bases 120 and 130, e.g. by welding, brazing, or metal adhesive. Under such circumstances, the fastener elements of the casing are constituted solely by the bases 120 and 130.

Furthermore, under certain circumstances, e.g. when the fiber blank is woven with prestress, the warp yarns or the weft yarns of the blank may be difficult to loosen. Under such circumstances, it may be difficult to insert fastener elements that present portions that are relatively bulky such as flat fastener portions. For this reason, the present invention proposes using fastener elements that are initially in the form of a cylindrical, rectangular, or other rod that is easily inserted under one or more yarns, with the fastener portions then being shaped after insertion.

Figure 10:
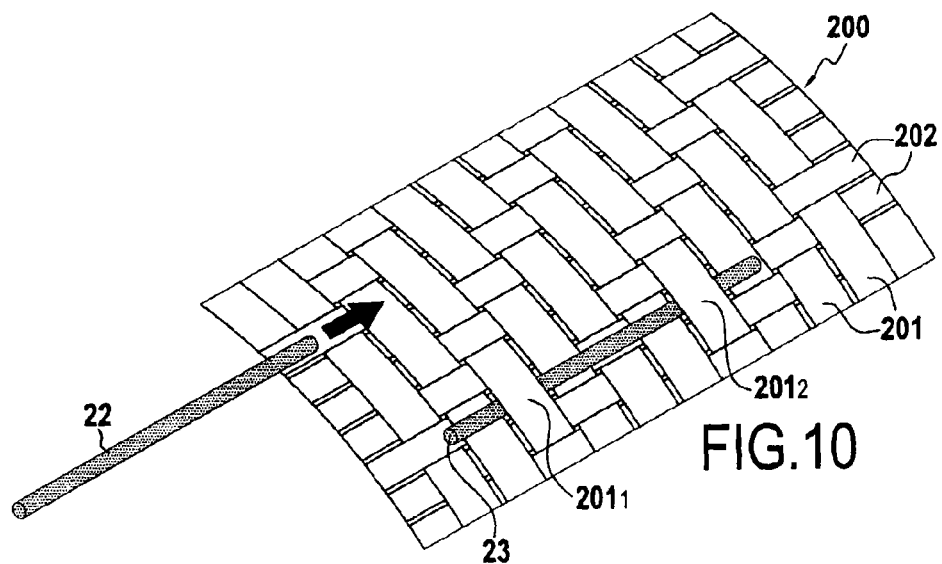
FIG. 10 is a diagrammatic perspective view showing two rods for forming fastener elements in a fiber structure in accordance with another embodiment.
Figure 11:
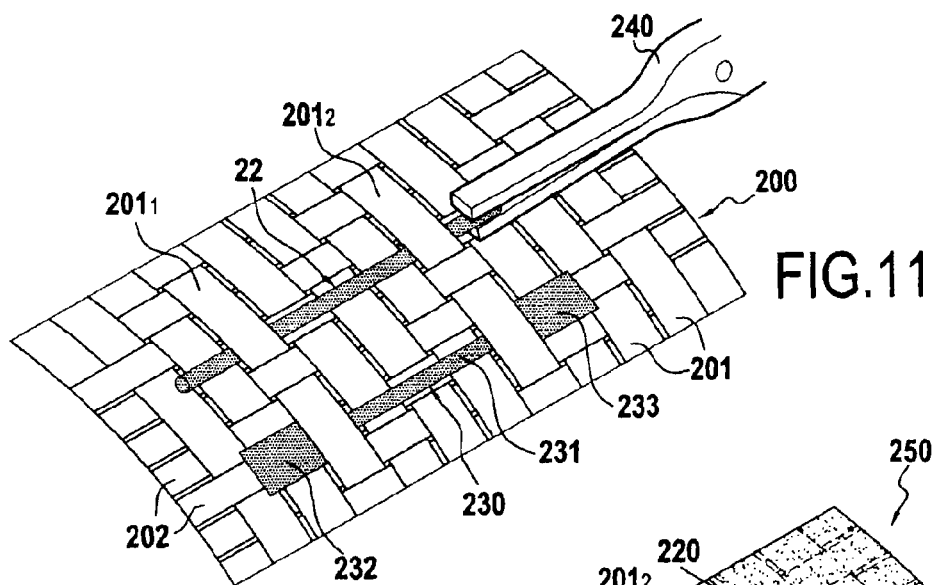
FIG. 11 is a diagrammatic perspective view showing the FIG. 10 fiber structure after insertion of the rods and after the ends of the rods have been flattened.
Figure 12:
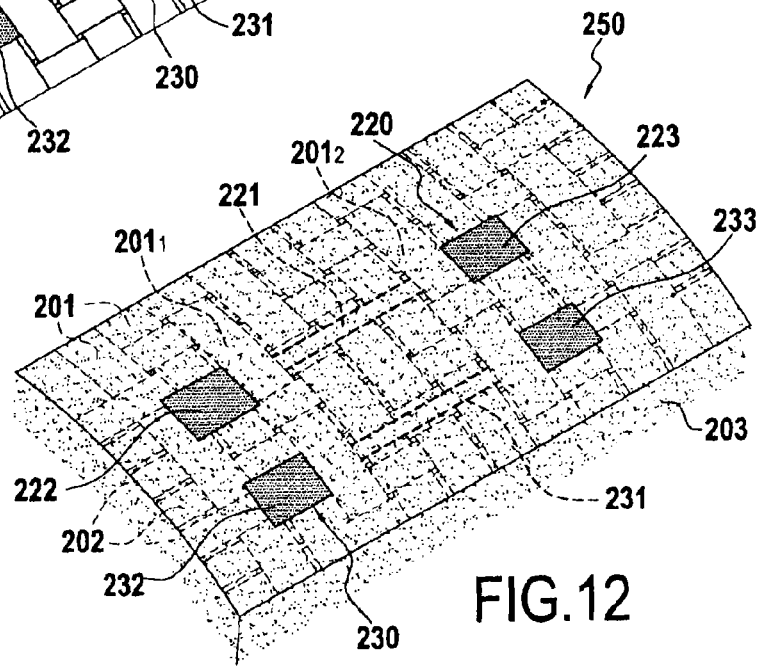
FIG. 12 is a diagrammatic perspective view showing the FIG. 10 fiber structure after densification.

By way of example, FIG. 10 shows a fiber blank 200 obtained by multilayer weaving, e.g. interlock weaving, between a plurality of layers of warp yarns 201 and a plurality of layers of weft yarns 202, these being woven together with prestress. Elements in the form of cylindrical rods 22 and 23, e.g. made of metal material, are inserted under the warp yarns $201_1$ and $201_2$. Because of their compact shape, the elements 22 and 23 can be slid under the warp yarns $201_1$ and $201_2$ without it being necessary to loosen them. Once the elements 22 and 23 have been inserted in this way, their ends are flattened, e.g. by means of pliers 240, so as to form fastener portions, as shown in FIG. 11. After the ends of the elements 22 and 23 have been flattened and after the blank 200 has been shaped and densified, as shown in FIG. 12, a composite material part 250 is obtained that has two fastener elements 220 and 230 comprising bodies 221 and 231 that are held on the part 250 both by the warp yarns $201_1$ and $201_2$ and by the polymerized resin 203 (matrix), together with fastener portions 222, 223, 232, and 233 of flat shape being present at the ends thereof, thereby providing an area that is sufficient for fastening other elements such as straps or fastener tabs of pieces of equipment.

Numerous variant embodiments of the invention may be envisaged. Such variants may concern in particular:
the number and the type of (warp or weft) yarns under which the fastener elements are inserted;

the shape of the fastener elements, both concerning the shape and the dimensions of the bodies and concerning the shape and the dimensions of the fastener portions of those elements;

the material of the fastener elements, which is not necessarily a metal material;

the number and the arrangement of fastener elements at the surface of the part, it being possible to use several such elements together or to unite such elements in order to form a fastener base, in particular when it is necessary to fasten a heavy piece of equipment; and the fastener means used for fastening pieces of equipment on the fastener elements, e.g. by welding, brazing, screw fastening, clamping, etc.

In addition, the shape and the dimensions of the parts of composite material made with the fiber structure of the invention may be various and are not limited in particular to parts having a structural body in the form of a shroud, but extend to parts of any other kind of shape (e.g. shroud sectors or panels that are plane or curved) on which one or more fastener elements can be incorporated in accordance with the invention.

Figure 13:
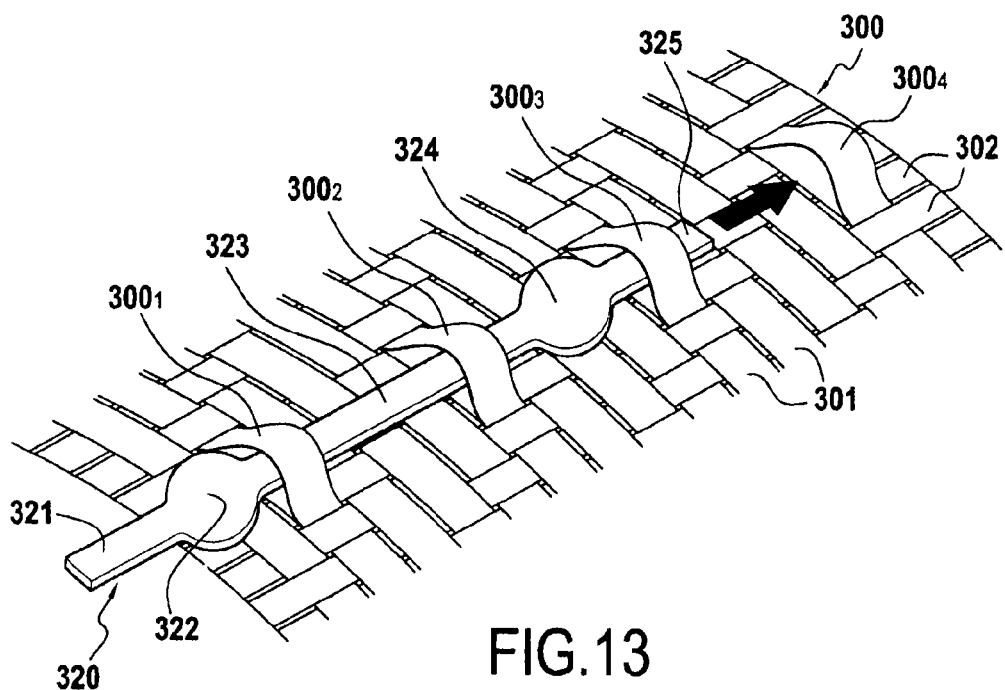
FIG. 13 is a diagrammatic perspective view showing the insertion of a fastener base in a fiber structure in accordance with another embodiment.

In a variant embodiment, the fastener base may include respective retaining tabs extending from each end of each fastener portion in order to increase the mechanical strength of the base, in particular against tear-out forces that might be exerted thereon. As shown in FIG. 13, a fastener base 320 comprises a body 323 having first and second fastener portions 322 and 324 at its ends. The first fastener portion 322 is extended away from the body 323 by a first retaining tab 321, while the second portion is extended away from the body 323 by a second retaining tab 325. The base 320 is inserted in a fiber blank 300 formed in the same manner as that described above for the blank 100. Warp yarns $301_1$, $301_2$, $301_3$, and $301_4$ are pulled out locally in order to loosen them and allow the base 320 to pass under them.

Once the base 320 has been put into position, the warp yarns $301_1$, $301_2$, $301_3$, and $301_4$ are tightened again so as to be pressed respectively against the first retaining tab 321 (yarn $301_1$), the body 323 (yarns $301_2$ and $301_3$), and the second retaining tab 325 (yarn $301_4$).

Figure 14:
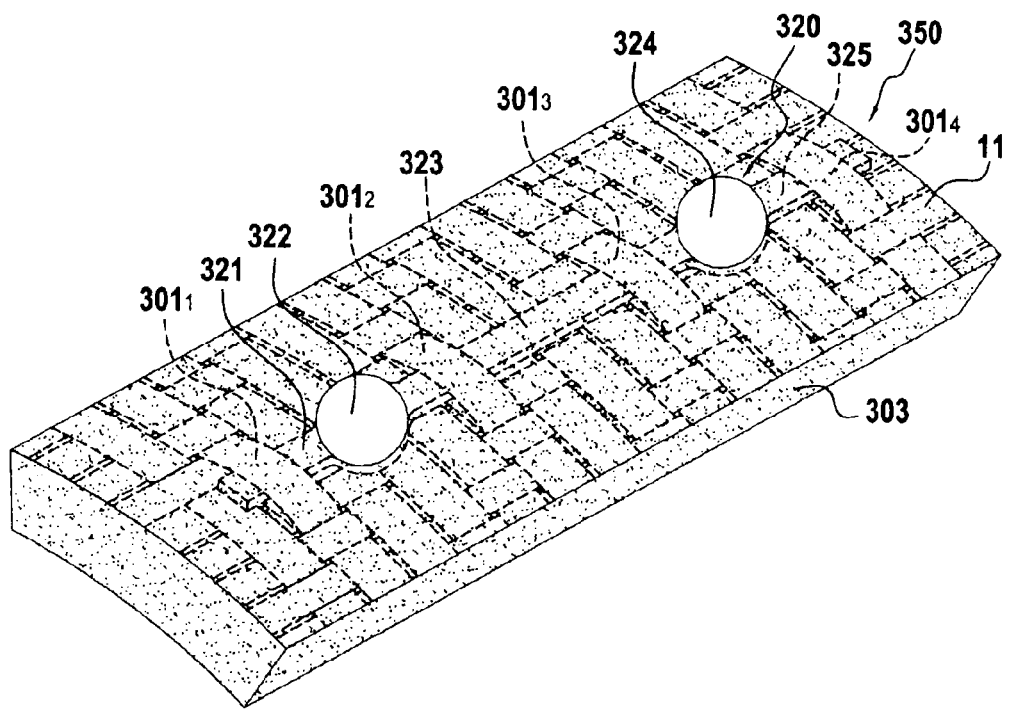
FIG. 14 is a diagrammatic perspective view showing the FIG. 13 fiber structure after densification.

After the blank 300 has been shaped and densified, as shown in FIG. 14, a composite material part 350 is obtained that includes a fastener element corresponding to the base 320 with its body 323 and its retaining tabs 321 and 325 held on the part 250 both by the warp yarns $201_1$ and $201_2$ and by the polymerized resin 203 (matrix), together with fastener portions 222, 223, 232, and 233 of flat shape being present at the ends thereof, thereby providing an area that is sufficient for fastening other elements such as straps or fastener tabs of pieces of equipment.

When using a fastener element that initially presents the form of a rod as described above with reference to FIGS. 10 to 12, a fastener element of the same type as the above-described base 320 may be obtained by inserting a rod of appropriate length under a plurality of yarns of the blank and by flattening portions of the rod that are situated at an intermediate distance between its two ends so as to form fastener portions that are extended by retaining tabs.

Furthermore, the mechanical strength of the fastener elements may be further increased by covering the faces of the fastener portions of the fastener elements that are situated beside the fiber blank with an adhesive that is compatible with the matrix used for densification.

The portions of the fastener elements other than the fastener portions themselves may be placed equally well under warp yarns, under weft yarns, or indeed both under warp yarns and under weft yarns (with the elements being arranged at 45° relative to the warp and weft directions).

In the above-described embodiments, a fastener element is integrated in the fiber structure by fastening the body of the element under yarns of the fiber structure that are locally pulled out and then subsequently tightened after the bodies of the fastener elements have been passed under these yarns and put into position.

In a variant embodiment, the bodies of the fastener elements may be held between the yarns of the fiber structure at the time the structure is woven. Under such circumstances one or more fastener elements, e.g. such as the bases 120, 130, and 320, or a plurality of parts that are to form fastener elements, such as the rods 22 and 23, are arranged on the fiber structure. One or more additional layers are then woven on the fastener elements as arranged in this way at the surface of the texture with some of the yarns of this/these additional layers holding the fastener elements or the parts that are to form such elements. Depending on the density with which this or these additional layers is/are woven, the yarns that may be present above the fastener portions of the fastener elements or the portions of the parts that are subsequently to form fastener portions of the fastener elements, such as the portions of the rods 22, 23 that are to be flattened in order to form the fastener portions, are moved away from these portions or parts and/or cut away locally. Thereafter, the fabrication of the composite material part including the fastener elements continues in the same manner as that described above.

The invention claimed is:

1. A fiber structure for reinforcing a composite material part, the structure having multilayer weaving between a plurality of layers of warp yarns and a plurality of layers of weft yarns, the fiber structure comprising:
   one or more fastener elements on a face of the fiber structure,
   each fastener element comprising a body arranged at least in part under one of the warp yarns present on the face of the fiber structure, and at least one fastener portion situated over the warp and weft yarns.

2. A structure according to claim 1, wherein each fastener element comprises first and second fastener portions extending on either side of the body and over the warp and weft yarns of the fiber structure.

3. A structure according to claim 2, wherein the first and second portions present a flat shape.

4. A structure according to claim 1, wherein each fastener portion is extended by a retaining tab arranged under one or more warp yarns of the fiber structure.

5. A composite material part comprising a fiber structure according to claim 1 and densified by a matrix.

6. A part according to claim 5, herein each fastener element further includes a strap fastened to each fastener portion.

7. A part according to claim 5, constituting an aeroengine casing.

8. A turboprop comprising an aeroengine casing according to claim 7.

9. An aircraft comprising at least one turboprop according to claim 8.

10. A structure according to claim 1, wherein the structure has an interlock weave, in which each layer of weft yarns intertinks the plurality of layers of warp yarns with all of the warp and weft yarns in a given weft column have a same movement in a weave plane.

11. A structure according to claim 1, wherein each fastener element is arranged on an external face of the structure.

12. A method of making a composite material part, comprising:
- making a fiber structure by multilayer weaving between a plurality of layers of warp yarns and a plurality of layers of weft yarns;
- shaping the fiber structure;
- densifying the fiber structure with a matrix; and
- before densifying the fiber structure, inserting a body of at least one fastener element under one of the warp yarns present on a face of the fiber structure, each fastener element including at least one fastener portion situated over the warp and weft yarns.

13. A method according to claim 12, wherein during the inserting the fastener element under the one of the warp yarns, the one of the warp yarns is accessible from the face of the fiber structure, and the one of the warp yarns is loosened to enable each fastener element to pass thereunder, the one of the warp yarns subsequently being tightened.

14. A method according to claim 12, wherein the fastener element is arranged on the fiber structure during weaving, with one or are additional layers being woven over the fastener element.

15. A method according to claim 12, wherein during the inserting the fastener element under the one of the warp yarns, the fastener element is in a form of a rod, and after the inserting, at least a portion of the fastener element situated over the warp and weft yarns of the fiber structure is flattened to form a fastener portion.

16. A method according to claim 12, wherein each fastener portion is extended by a retaining tab that is arranged under one or more warp yarns of the fiber structure during the inserting the fastener element under the one of the warp yarns.

17. A method according to claim 12, wherein each fastener element includes a strap fastened on each of the fastener portions.

18. A method according to claim 12, wherein the fiber structure has an interlock weave, in which each layer of weft yarns interlinks the plurality of layers of warp yarns with all of the warp and weft yarns in a given weft column have a same movement in a weave plane.

19. A method according to claim 12, wherein each fastener element is arranged on an external face of the fiber structure.

* * * * *